INVENTOR.
ALEXANDER M. ALEXANDRESCU
BY
A. M. ALEXANDRESCU

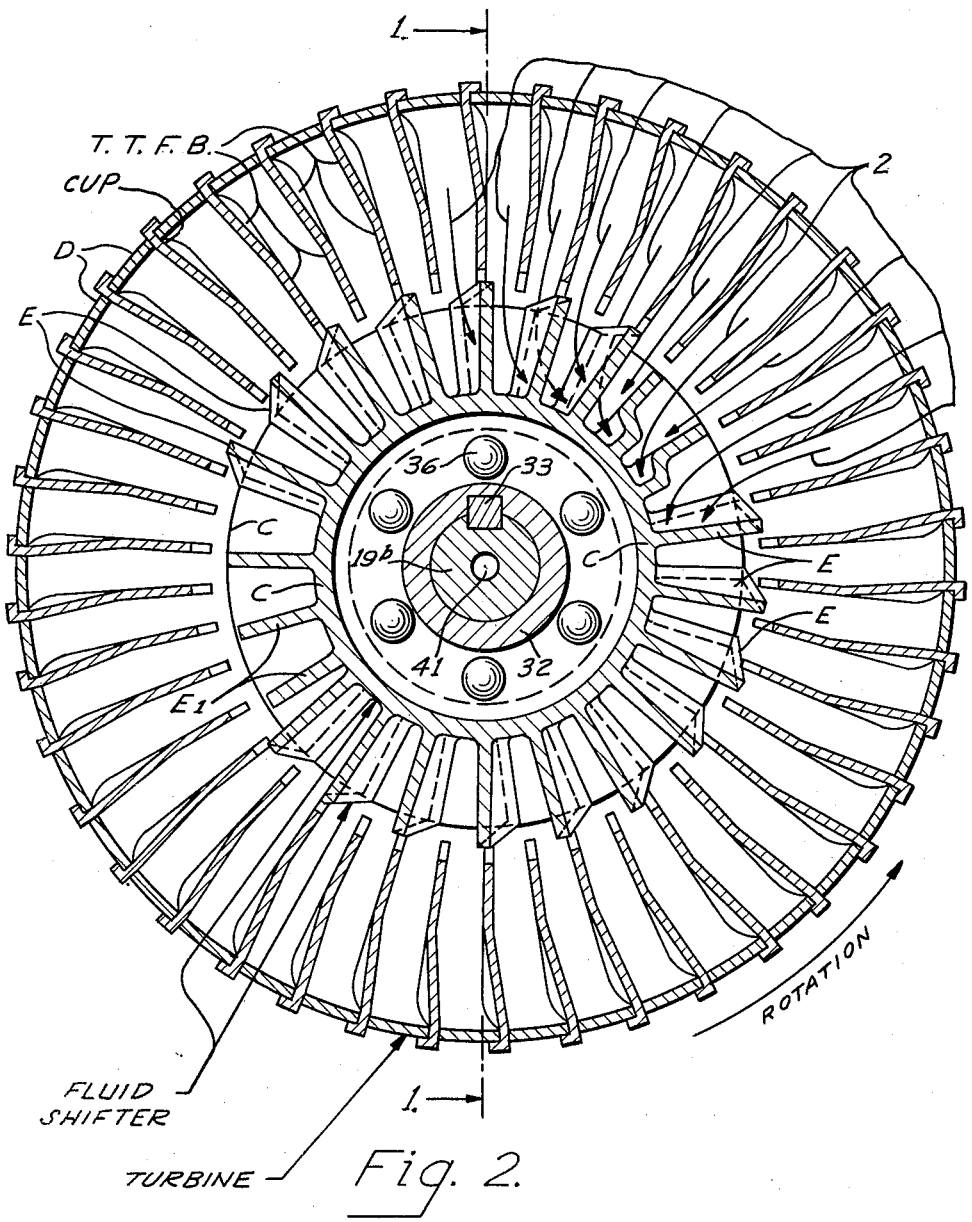

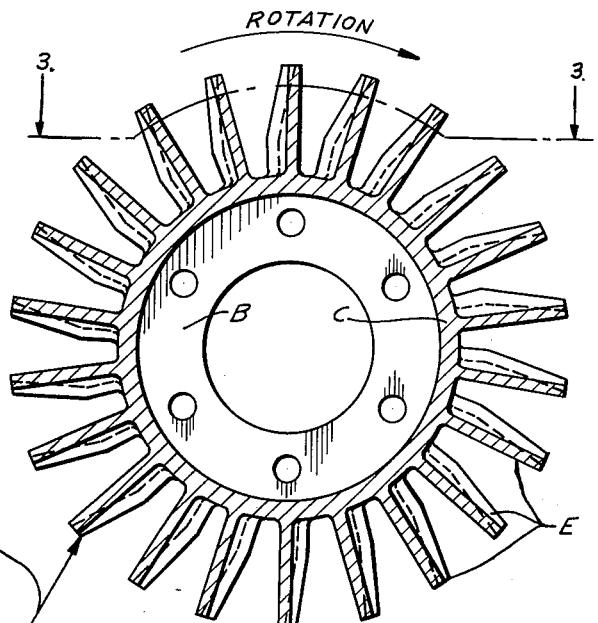
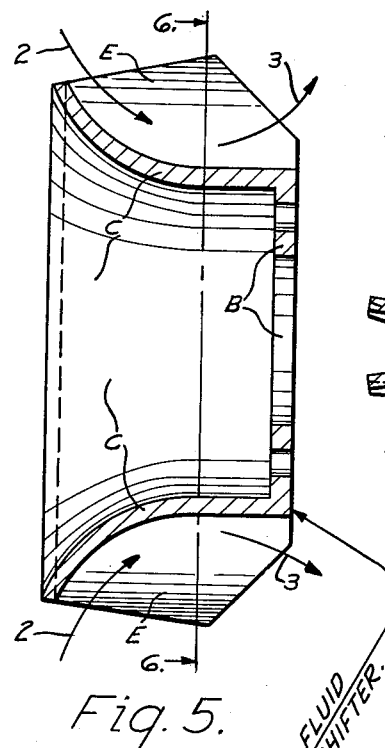
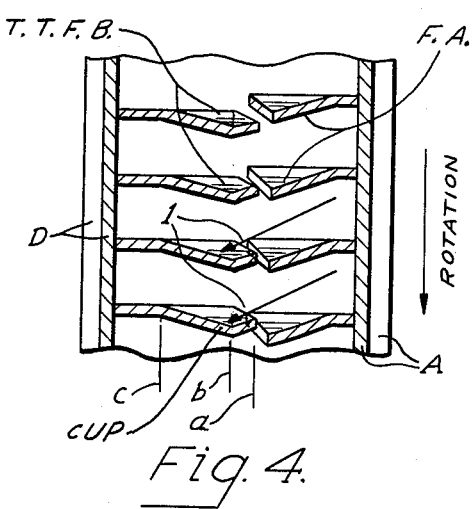
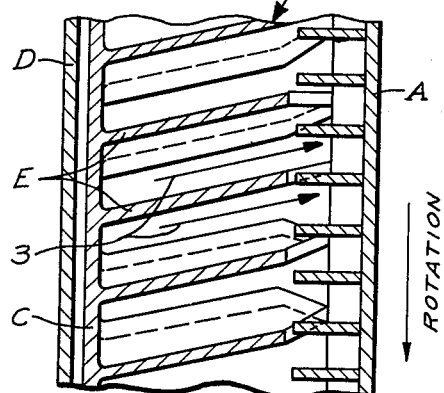

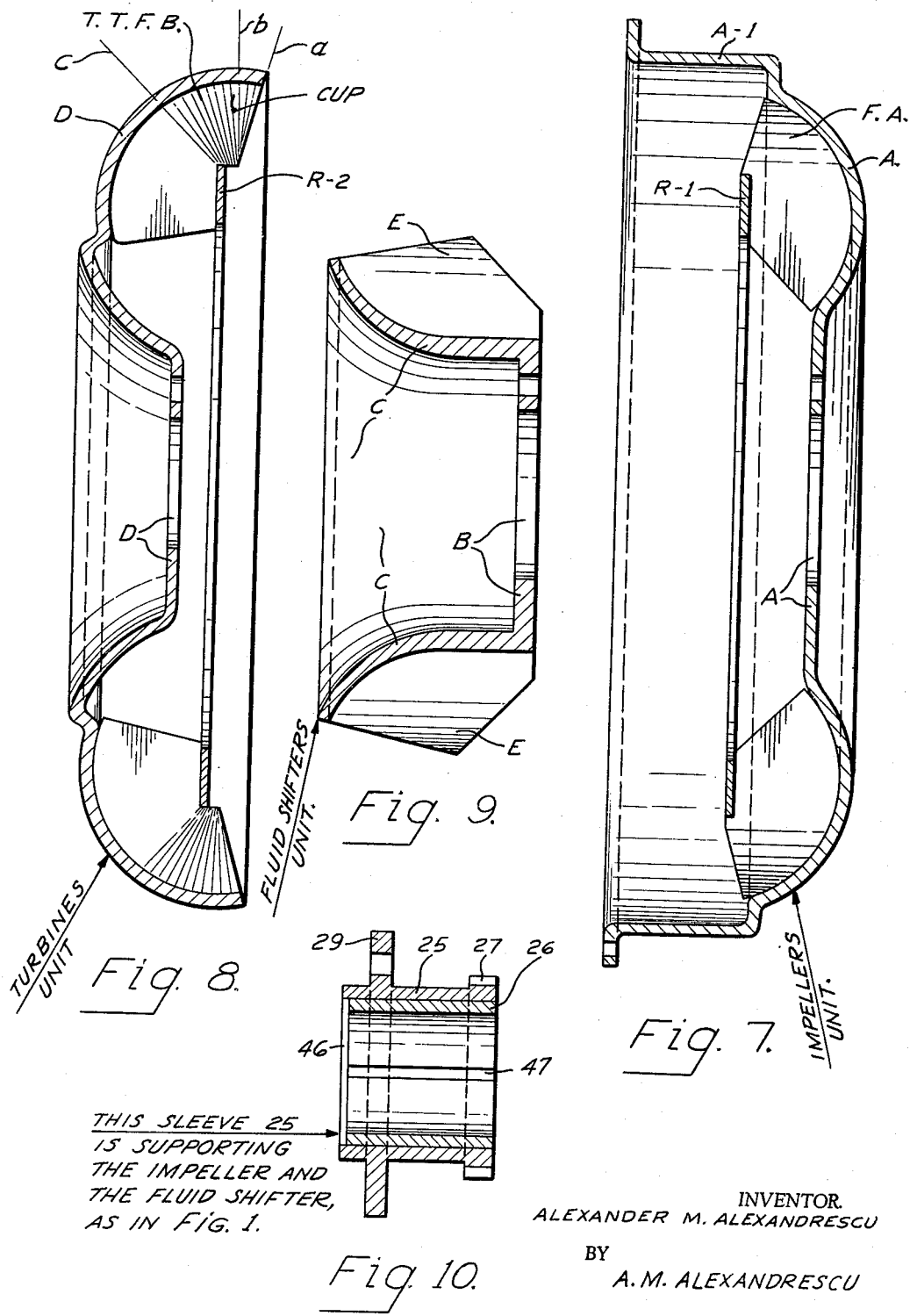

United States Patent Office 3,167,918
Patented Feb. 2, 1965

3,167,918
FLUID COUPLING
Alexander M. Alexandrescu, 549 E. 114th St.,
Cleveland, Ohio
Filed Sept. 12, 1961, Ser. No. 138,230
5 Claims. (Cl. 60—54)

My invention relates to improvements in construction of fluid couplings, and more particularly to fluid couplings for use in automotive vehicles and the like, such as I have disclosed in my United States Patent No. 2,720,-952, "Rotary Turbine Type Fluid Coupling," issued October 18, 1955, which patent was re-issued May 30, 1961 under Number Re. 24,991. My United States Patent No. 2,952,976, "Rotary Turbine Type Fluid Coupling," issued September 20, 1960, illustrates the Fluid Shifter, identified in said patent by the numerals 123, 124, 125 and 126 in FIGS. 22, 23, 24, 25 and 26.

This fluid shifter is also a simplification of the construction shown in my patent application Serial Number 54,438 (now abandoned), filed September 7, 1960, titled "Double-Acting Rotary Reactor Torque Converter," assigned to U.S. Patent Office Division 18.

It is an object of my present invention to provide a fluid coupling device of the above-mentioned type incorporating substantial improvements in design and function over previous fluid couplings.

Another object of my invention is to provide a fluid coupling device which is so designed as to prevent excessive slippage in the transmission of power, to start smoothly, and to multiply torque.

A further object of my invention is the provision of an improved fluid coupling device which produces a substantial torque multiplication and is, in fact, a transmission within itself.

Yet another object of my invention is to provide an improved fluid coupling device readily adaptable to all makes or types of automatic transmissions without necessitating major changes in the rear of the vehicle engine, the transmission casing, or the internal parts of the mechanical transmission.

Still another object of my invention is to provide an improved fluid coupling device designed for economical production on high speed machinery, as well as to provide fuel economy during operation of the vehicle.

Further objects of my invention, and the invention itself, will become more readily apparent from a study of the appended description and the attached drawings, in which drawings:

FIG. 2 is a vertical cross-cut section of fluid coupling, viewed as indicated by arrows 2—2 in FIG. 1, from rear to front; in this figure the turbine D and the front part of fluid shifter are shown in action.

Figure 1:
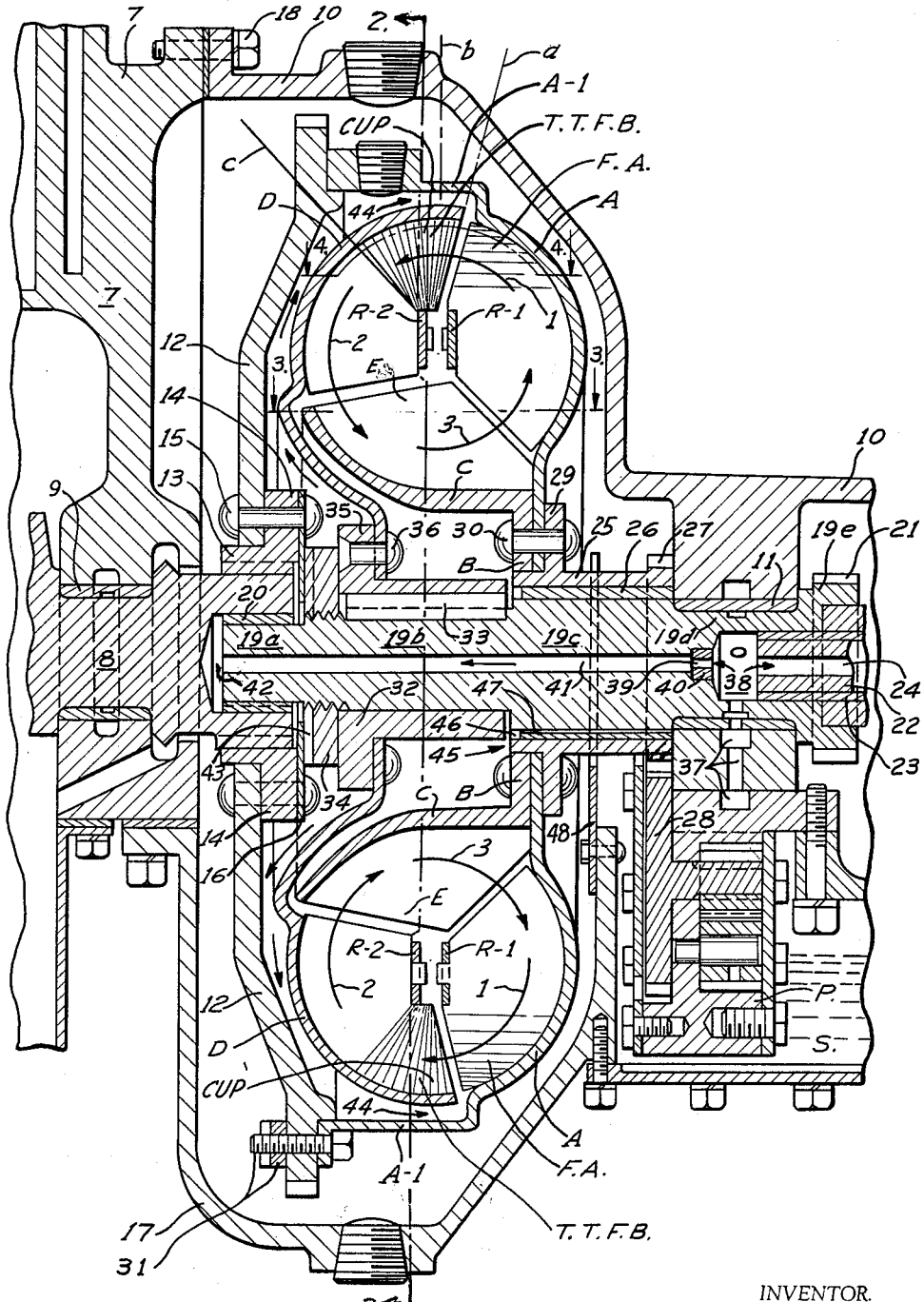
FIG. 1 illustrates a longitudinal vertical cut section of fluid coupling, viewed from the left side; in this figure the impeller A and the fluid shifter C are at the rear, and turbine D is in front.

FIG. 3 is a horizontal cut section of fluid coupling, viewed from top down, as indicated by arrows 3—3 in FIG. 1; this figure can also be determined from FIGS. 5 and 6 from horizontal line indicated by arrows 3—3, and 3—3 from top down.

FIG. 4 is a horizontal cut section of fluid coupling, taken from FIG. 1, viewed as indicated by arrows 4—4 on upward arcuate line, from top down; this figure shows the impeller's F.A. (forward advanced) fluid blades, and the turbine's T.T.F.B. (two-way tapered fluid blades) forming a fluid driving cup.

FIG. 5 illustrates the construction of fluid shifter unit; this unit is taken from FIG. 1.

FIG. 6 is a vertical cross-cut section of fluid shifter unit, view taken from vertical line indicated by arrows 6—6, from front to rear in FIG. 5.

FIG. 7 illustrates the impeller unit separately, as taken from FIG. 1.

FIG. 8 illustrates the turbine unit separately, as taken from FIG. 1.

FIG. 9 illustrates the fluid shifter unit separately, as taken from FIG. 1.

FIG. 10 illustrates the sleeve shaft separately, as taken from FIG. 1; note that the impeller and the fluid shifter unit are riveted or otherwise securely fastened to said sleeve shaft, for rotational movement therewith, as shown in FIG. 1.

Referring to the drawings, in FIGS. 1, 2, 3, 5, 6 and 9, the construction of the fluid shifter unit is very simple. It is composed of flange B, annular body C and the tilted blades E. The annular front half or intake portion of the fluid shifter unit rotates within the annular inner walls of the turbine's blades, and the annular rear half or exit portion of the fluid shift unit is positioned close to the annular inner wall of the impeller's blades, as in FIG. 2 from rear to front; to see this construction more clearly, refer first to vertical lines in FIG. 1 indicated by arrows 2—2, then secondly to vertical line through FIGS. 3 and 5, as indicated by arrows 2—2 from rear to front.

Note that in FIG. 2 some of the fluid shifter's tilted blades E are shown partly cut away to illustrate how the tilted blades E induce the fluid from the turbine; the fluid circulation is indicated by the arrows number 2, FIGS. 1 and 2. To the left, at E1, FIG. 2, three of the tilted blades are cut away to wall C, to show more clearly the construction of the tilted blades E.

Though the present invention is adapted to other environments, in the drawings and this specification, for the sake of convenience, it is shown and described as applied to an automobile. Thus, in the aforementioned drawings, numeral 7 is the engine block, 8 is the engine crankshaft, 9 is the engine rear main bearing, 10 is the power transmission casing, 11 is the power transmission bearing, 12 is the flywheel, 13 is the spline fitted over the rear end of crank shaft 8; the flywheel 12 is set on the spline 13, and is riveted on the spline's flange 14 with rivets 15; a stop plate 16 is also riveted in the rear of flange 14; 17 is the bottom plate; the power transmission casing 10 is attached to the engine block 7 by bolts 18. The turbine shaft rotates with its front end 19a in bushing bearing 20 located in the rear end of crankshaft 8, and at the rear rotates with part 19d in power transmission bearing 11; at the rear, the shaft 19e is provided with gear 21, which gear rotates the low and reverse shifts. In the rear end of turbine shaft at 19e the power transmission shaft 22 rotates in bushing bearing 23; hole 24, in shaft 22, supplies fluid pressure from main pump to automatic shifting clutches in power transmisison. A short sleeve shaft 25, provided with bushing bearing 26, rotates freely on the turbine shaft at 19c; the sleeve shaft 25 is provided at the rear with gear 27, which gear rotates the large main pump gear 28; the sleeve shaft 25 is also provided with circumferential flange 29, on which flange is set the impeller A, and fluid shifter C with flange B; both impeller and fluid shifter are riveted on flange 29 with rivets 30; the impeller A is provided with extension A–1, which extension is set on the flywheel 12 and is clamped tightly with bolts and nuts 31; this makes the enclosure of coupling to retain the fluid, and also connects the impeller A, fluid shifter C, and transmission main pump P to the engine crankshaft to be rotated direct. Hub 32 is keyed and locked on the turbine shaft at 19b with key 33 and nut 34; hub 32 is also provided with a circumferential flange 35; turbine D is set on and solidly riveted to flange 35 with rivets 36; thus, the turbine is solidly connected to the shaft and rotates gear 21 (at rear) which gear 21 rotates or drives the automatic power transmission. When engine is started, the main pump P supplies fluid pressure to passageway 37 and space 38; from space 38 the fluid pressure flows through hole 24 in shaft 22 to the power transmission's automatic shifting clutches, which automatic transmission clutches are illustrated in another group of drawings. Also from space 38, fluid pressure is directed through the small orifice 39 in plug 40, into hole 41 in turbine shaft; as indicated by the arrow, the fluid is delivered into space 42 in engine crank shaft 8, through grooves 43 in bushing bearing 20, and via lock nut 34 delivers the fluid into the coupling; the fluid enters into the coupling as indicated by arrows 44; air is exhausted from the coupling as indicated by arrow 45, into the circumferential space 46 and out through grooves 47 located in bushing bearing 26; when coupling is completely filled with fluid, any excess fluid drops at transmission pump into sump at S. Plate 48 keeps any splash of fluid within the sump.

In operation, or driving, when the vehicle stops and the engine drops to idling speed, the impeller's forward-advanced blades F.A. slow down the circulation of fluid in the coupling; when the throttle is advanced or opened to start the vehicle rolling again, fluid from the impeller's forward-advanced blades F.A. is projected into the turbine's cupped blades at two-way tapered fluid blades T.T.F.B.; this is the first fluid action in the coupling and is indicated by the large arrow 1 in FIGS. 1 and 4; the fluid is taken from the turbine by the fluid shifter's tilted blades E, which action is indicated by the large arrow 2 in FIGS. 1, 2 and 5; then, the rotary fluid shifter unit's tilted blades E shift, or transfer, the fluid into the impeller's blades F.A. to be reprojected over and over again; this fluid action is indicated by the large arrow 3 in FIGS. 1, 3 and 5.

As stated above, impeller A and fluid shifter C are rotated by the engine. Note particularly that when the engine is accelerated, the rotary fluid shifter unit, by reason of its rotation within the turbine in the direction of rotation and its close proximity to the driver blades of the impeller as well as the pattern and tilt or inclination of its fluid shifting vanes, actually charges and recharges the impeller's driving blades with a velocity-pressurized, induced flow of centrifugally-directed fluid. This controlled, directed, assured supply of fluid-in-motion, at a velocity greater than yet accomplished by other means, compounds the weight-to-velocity ratio of customary fluid mediums, thus producing a resultant increase in efficiency and driving power of the fluid coupling.

As illustrated in drawings and described in specifications, this fluid coupling is composed of three important units, as illustrated particularly in FIGS. 7, 8 and 9 in Drawing No. 4, each unit independent or separate in construction, but all three united in function. These are:

1st unit—the impeller
2nd unit—the turbine
3rd unit—fluid shifter unit

As shown in FIGS. 1, 2, 3, 4 and 5, arrow No. 1 indicates the fluid projected into the turbine by the impeller; arrow No. 2 indicates the fluid taken by the rotary fluid shifter from the turbine; arrow No. 3 indicates the fluid shifted, transferred, or fed by the rotary fluid shifter into the impeller's vanes to be re-projected. By the combined action of these three units, the fluid in the coupling is circulated at an extremely high velocity, which increases the driving power of the coupling.

I claim the construction and function of the rotary fluid shifter unit and the mechanism adapted to help in producing a substantial torque multiplication, etc., substantially as described.

I claim as my invention:

1. A fluid coupling comprising a driving shaft and a coaxial driven shaft; a sleeve shaft freely rotatable upon said driven shaft; an impeller, a turbine, and a fluid shifter element defining a torus ring and providing complementary portions of a substantially circular torus section; said impeller comprising an annular impeller shell carrying a plurality of driving blades each having an edge attached to said impeller shell, an outlet edge adjacent to the outer periphery of said ring, and an inlet edge adjacent to the inner periphery of said ring; said turbine comprising an annular turbine shell carrying a plurality of driven blades each having an edge attached to said turbine shell, an inlet edge adjacent to the outer periphery of said ring, and an outlet edge adjacent to the inner periphery of said ring; said fluid shifter element comprising an annular fluid shifter shell carrying a plurality of vanes each having an edge attached to said fluid shifter shell, an inlet edge adjacent to said outlet edge of said driven blades, and an outlet edge adjacent to said inlet edge of said driving blades; said impeller being carried by said sleeve shaft; means connecting said driving shaft with said impeller; the outlet edges of said driven blades and the inlet edges of said driving blades being angled away from each other and away from a plane disposed medially through said torus ring transversely to the axis thereof; said fluid shifter element being mounted to said impeller and said vanes extending across said plane and redirecting fluid from said turbine back to said impeller in use of said coupling.

2. A fluid coupling as set forth in claim 1 wherein the recited vanes and fluid shifter shell comprise an integrally formed unit.

3. A fluid coupling as set forth in claim 1 wherein the inlet edges of said driven blades extend arcuately in the direction of said impeller beyond said plane and wherein the outlet and inlet edges of said driving and driven blades respectively are closely adjacent to each other.

4. A fluid coupling comprising a driving shaft and a coaxial driven shaft; a sleeve shaft freely rotatable upon said driven shaft; an impeller, a turbine, and a fluid shifter element defining a torus ring; said impeller comprising an annular impeller shell carrying a plurality of driving blades each having an edge attached to said impeller shell, an outlet edge adjacent to the outer periphery of said ring, and an inlet edge adjacent to the inner periphery of said ring; said turbine comprising an annular turbine shell carrying a plurality of driven blades each having an edge attached to said turbine shell, an inlet edge adjacent to the outer periphery of said ring, and an outlet edge adjacent to the inner periphery of said ring; said fluid shifter element comprising an annular fluid shifter shell carrying a plurality of vanes each having an edge attached to said fluid shifter shell, an inlet edge adjacent to said outlet edge of said driven blades, and an outlet edge adjacent to said inlet edge of said driving blades; said shells being arcuate in section and providing complementary portions of a hollow-torus section; said impeller being carried by said sleeve shaft; means connecting said driving shaft with said impeller and encasing said turbine in spaced relation to said turbine; the outlet edges of said driven blades and the inlet edges of said driving blades being angled away from each other and away from a plane disposed medially through said torus ring transversely to the axis thereof; said fluid shifter element being mounted to said impeller and said vanes extending across said plane and redirecting fluid from said turbine back to said impeller in use of said coupling.

5. A fluid coupling as set forth in claim 4; each said driven blade having a cuplike depression on the trailing side of said blade adjacent to the inlet edge of said blade; said vanes intercepting fluid from said turbine and forcing it into said driving blades which in turn redirect said fluid into said depressions of said driven blades.

References Cited in the file of this patent

UNITED STATES PATENTS

| | | |
|---|---|---|
| 2,128,828 | Klepper | Aug. 30, 1938 |
| 2,380,681 | Wolfram | July 31, 1945 |
| 2,388,329 | Jandasek | Nov. 6, 1945 |
| 2,393,859 | Jandasek | Jan. 29, 1946 |
| 2,624,175 | Raney | Jan. 6, 1953 |
| 2,663,148 | Jandasek | Dec. 22, 1953 |
| 2,720,952 | Alexandrescu | Oct. 18, 1955 |
| 2,890,661 | Egbert | June 16, 1959 |
| 2,952,976 | Alexandrescu | Sept. 20, 1960 |